Jan. 14, 1941. W. V. WARREN 2,228,796
STACKER
Filed April 5, 1939 7 Sheets-Sheet 7

Inventor
William V. Warren.
By Lacey & Lacey, Attorneys

Patented Jan. 14, 1941

2,228,796

UNITED STATES PATENT OFFICE 2,228,796

STACKER

William V. Warren, Salina, Kans., assignor to The F. Wyatt Manufacturing Company, Incorporated, Salina, Kans., a corporation of Kansas Application April 5, 1939, Serial No. 266,180

7 Claims. (Cl. 214—140)

This invention relates to an improved machine, hereinafter called a stacker, for gathering hay, straw, or like crops from the swath, windrow or bunch and loading such crops on wagons or trucks, and/or stacking them.

One object of the invention is to provide a stacker, the operation of which will be entirely continuous and automatic so that a load may be gathered, transported to a desired location, raised to the necessary height, and dumped, all without the necessity of stopping for the purpose of shifting various controls.

Another object of the invention is to provide a stacker employing improved hitching mechanism.

A further object of the invention is to provide a stacker having novel mounting means for the fork employed so that the machine may be used as a sweep rake.

A further object of the invention is to provide a stacker having novel clutch and shifter mechanism.

A still further object of the invention is to provide a stacker wherein means are employed for automatically raising the points of the teeth of the fork as the machine moves along the ground and preliminary to the lifting of the fork toward raised position.

Still another object is to provide a machine of this character employing improved, simplified mechanism for tilting a loaded fork and dumping the load, said mechanism including springs for absorbing the shock when dumping the load.

Another object of the invention is to provide a stacker which will be characterized by the utmost simplicity and ease of operation.

And still another object of the invention is to provide a stacker which may be used with various types of tractors.

Other objects of the invention will become apparent as the description proceeds.

My invention is illustrated in the accompanying drawings, wherein:

Figure 17 is a detail sectional view showing the mechanism employed for shifting the fork carrying frame.

Figures 1, 18, 19:
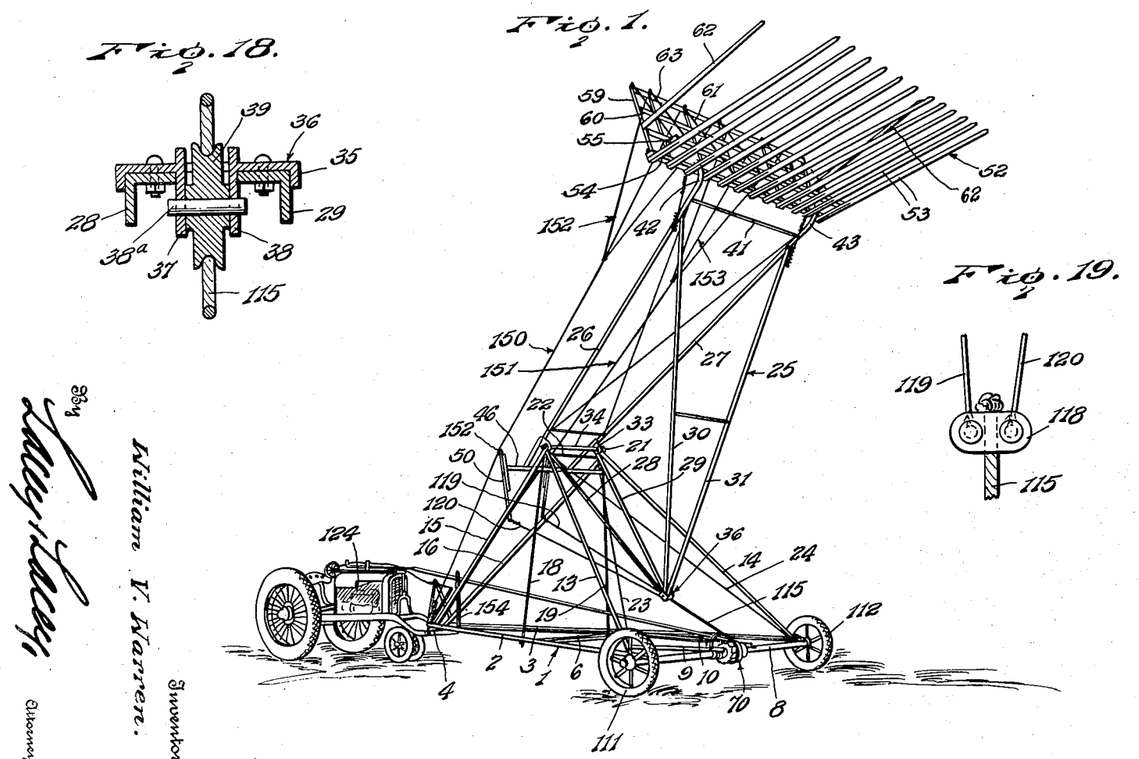
Figure 1 is a perspective view of my improved stacker as it would appear with the fork in elevated position.
Figure 18 is a detail sectional view on the line 18—18 of Figure 17, looking in the direction indicated by the arrows.
Figure 19 is an enlarged detail plan view of the operating clamp for the fork carrying frame.
Figures 2, 16, 20:
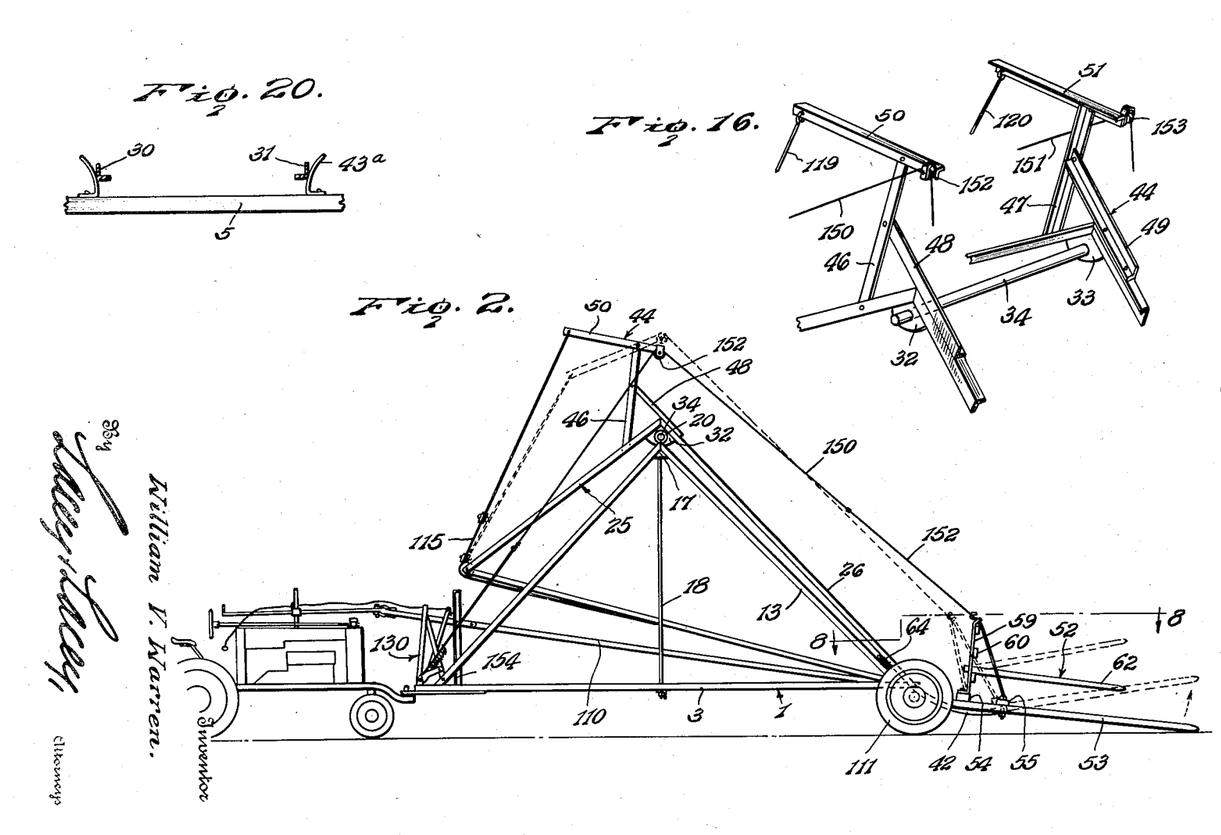
Figure 2 is a side elevation showing the stacker with the fork in lowered position, the fork being shown in its raised position in dotted lines.
Figure 16 is a detail perspective view of the operating lever structure employed for raising the fork carrying frame.
Figure 20 is a detail sectional view, on a reduced scale, showing the guides employed for guiding the fork supporting frame in lowered position.
Figures 3, 11:
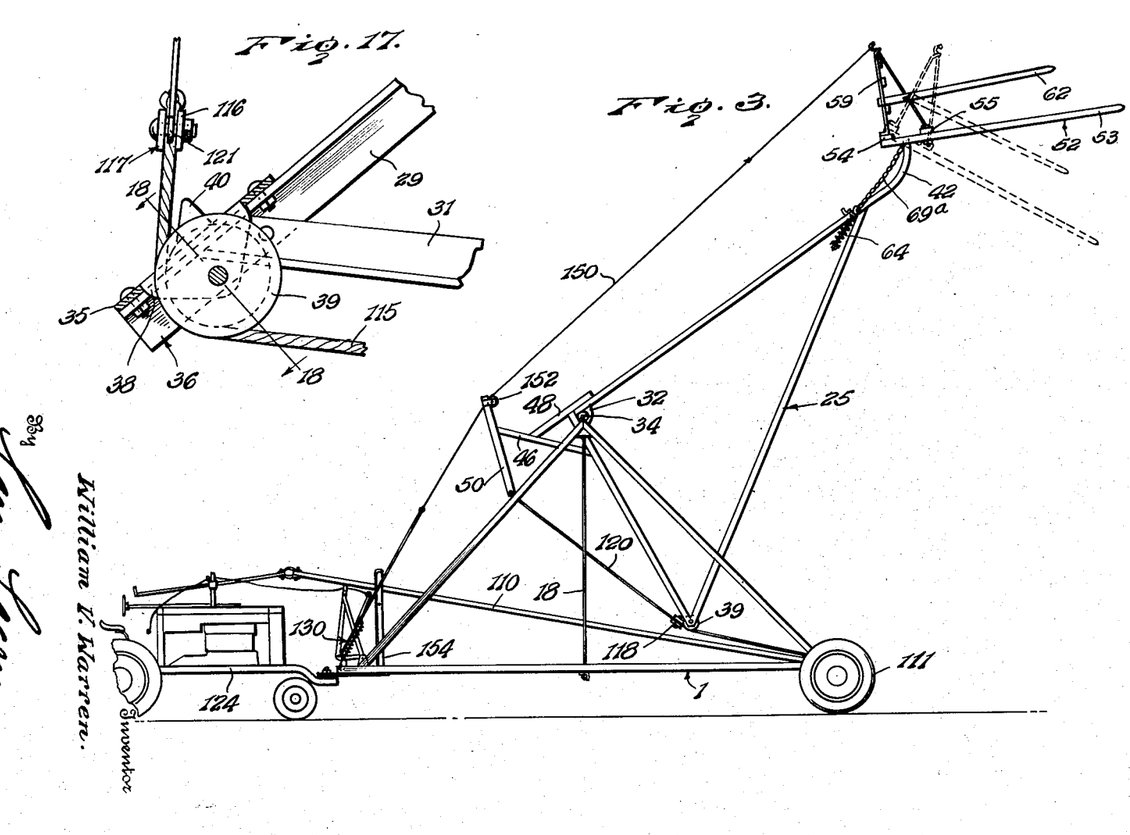
Figure 3 is a side elevation showing the stacker with the fork and supporting frame therefor in raised position, the position of the fork after dumping being shown in dotted lines.
Figure 11 is a transverse sectional view on the line 11—11 of Figure 9.
Figure 8:
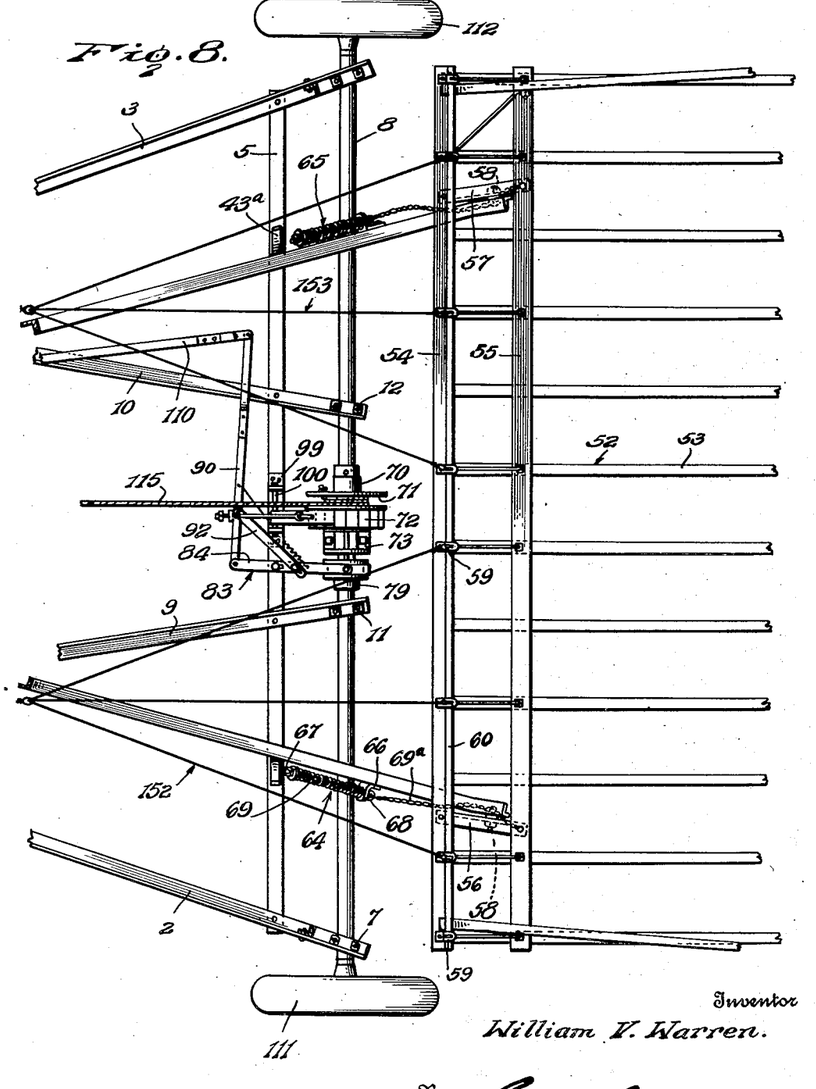
Figure 8 is a top plan view of the forward end of the stacker, showing the fork and the clutch and shifter mechanism, on the line 8—8 of Figure 2.
Figure 9:
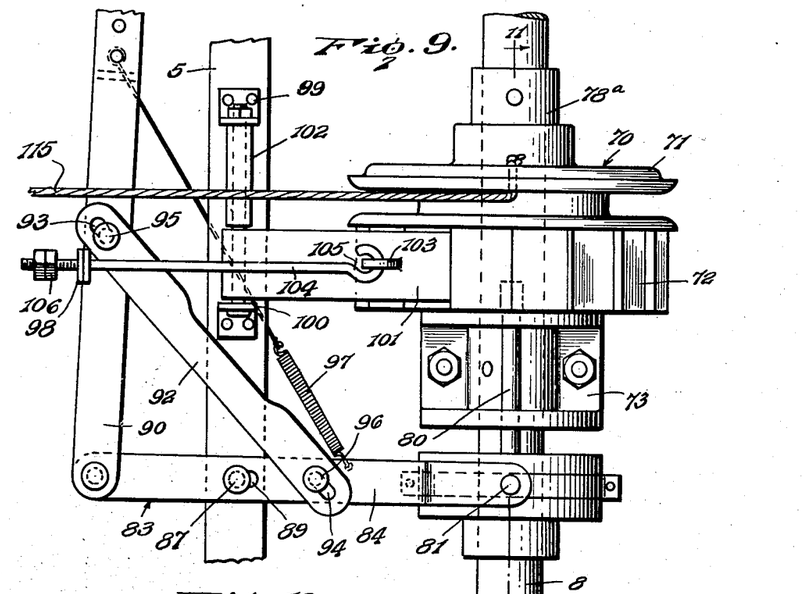
Figure 9 is an enlarged detail top plan view of the clutch and shifter mechanism.
Figure 10:
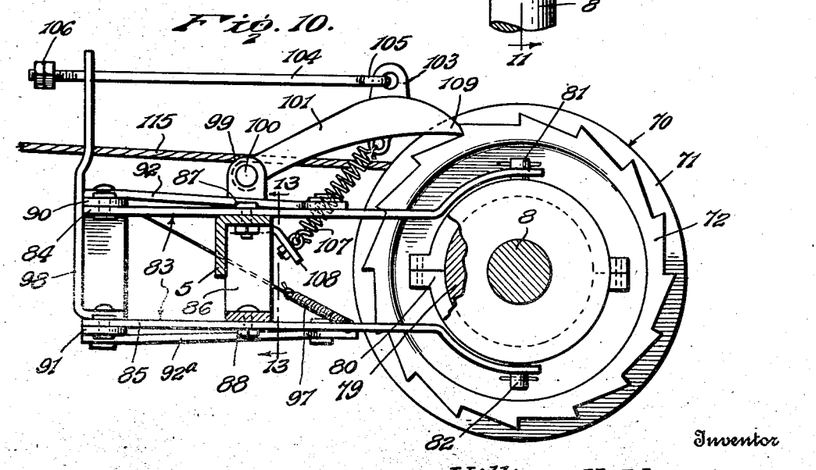
Figure 10 is a longitudinal sectional view of the clutch and shifter mechanism.
Figure 11:
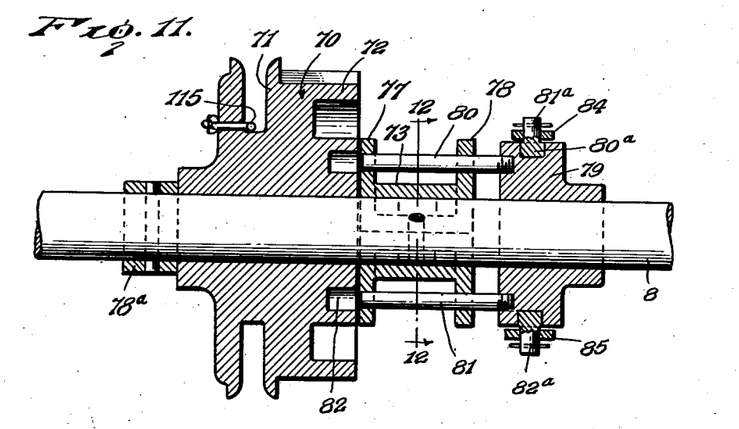
Figure 12:
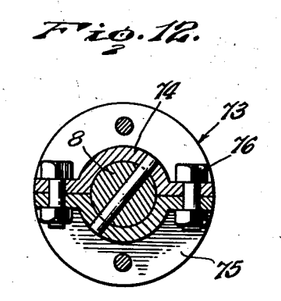
Figure 12 is a detail sectional view on the line 12—12 of Figure 11.
Figure 13:
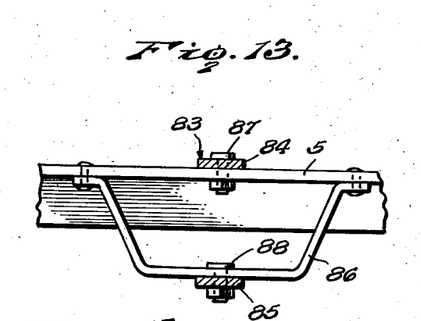
Figure 13 is a detail sectional view on the line 13—13 of Figure 10.

Referring now more particularly to the drawings, wherein similar reference numerals designate like parts throughout the several views, the numeral 1 indicates, in general, the body frame of my improved stacker. The body frame is best seen in Figures 1, 2 and 3 of the drawings, and is substantially triangular in side elevation. The body frame has lower side beams 2 and 3 which converge rearwardly and are connected at their corresponding rear ends by a hitch plate casting 4. At their corresponding forward ends, the beams 2 and 3 are connected by a front cross beam 5, while a central cross beam 6 connects said lower side beams 2 and 3 medially of their ends. As seen in Figure 8 of the drawings, the beams 2 and 3 are projected forwardly past the front cross beams 5 and are connected at their free ends to bearings 7 on the axle 8. Diagonally extending braces 9 and 10 extend from the midpoints of the beams 2 and 3 to the axle 8, said braces being connected to the central portion of the axle by bearings 11 and 12.

The body frame 1 includes front beams 13 and 14 and rear beams 15 and 16. The beams 13 and 14 have their corresponding lower ends secured to the lower side beams 2 and 3, near their forward ends, while the rear beams 15 and 16 converge downwardly and have their corresponding lower ends connected to said side beams 2 and 3. The front and rear beams, at each side of the frame 1, are connected at their corresponding upper ends by plates 17. That is to say, the beams 13 and 15 are connected by one of the plates 17, while the beams 14 and 16 are connected by the other of the plates 17. Rising substantially perpendicularly from the lower side members 2 and 3, at their midportions, are bearing posts 18 and 19. The bearing posts 18 and 19 have their lower end portions secured in the lower side members and their upper end portions secured to the inner surfaces of the plates 17. As best seen in Figure 2, the corresponding upper ends of the posts 18 and 19 are turned to define bearing loops 20 and 21. Connecting the upper ends of the front beams 13 and 14 is a tie beam 22, which serves the purpose of connecting the sides of the body frame at its upper extremity and in order to provide increased bracing for the body frame, I provide crossed rods 23 and 24. The front and rear beams 13, 14, 15 and 16 effectively brace the bearing posts.

Swingingly connected with the body frame is a fork supporting frame 25 which is substantially triangular in shape. The fork supporting frame 25 comprises upper side bars 26 and 27, rear side bars 28 and 29, and lower side bars 30 and 31. The upper side bars 26 and 27 are connected to the rear side bars 28 and 29 by bearing plates 32 and 33, through which bearing plates extends a mounting shaft 34. The opposite ends of the shaft 34 are journaled by the loops 20 and 21. It will now be understood how the fork supporting frame is swingingly connected with the body frame 1. As best seen in Figure 1, the rear side bars 28 and 29 and the lower side bars converge and are connected by a pulley frame 35 to define an apex portion 36. The pulley frame 35, as seen in Figures 17 and 18, has ears 37 and 38 between which, on a pin 38a, is mounted a pulley 39. The ears 37 and 38 are projected to define parallel stop members 40.

The upper side bars 26 and 27 are spaced apart at their corresponding forward end portions by a forward brace 41. The lower side bars 30 and 31 are connected, respectively, to the bars 26 and 27 slightly rearwardly of the brace 41. As clearly seen in Figures 1, 2 and 3, the bars 26 and 27 are projected forwardly and turned to define upwardly curved portions 42 and 43. Guide springs 43a are mounted on the front cross beam 5 and guide the frame 25, in lowered position.

Mounted on the fork supporting frame 25 at the pivotal points thereof, is a lever supporting frame 44. The lever supporting frame 44 has mounting posts 46 and 47 which rise angularly from the rear side bars 28 and 29, and bracing posts 48 and 49 which are respectively connected to the upper side bars 26 and 27 and project in the same plane. Pivotally connected to the corresponding upper ends of the mounting posts 46 and 47 are operating levers 50 and 51.

The fork 52, for gathering hay or other material to be stacked, is best seen in Figures 1 and 8 of the drawings, and is substantially L-shaped in side elevation. The fork 52 includes a plurality of laterally spaced tines or prongs 53 which are connected at their corresponding inner ends to a terminal bar 54. In order to brace the tines 53 against lateral swinging movement, I provide a brace bar 55 which extends in parallel spaced relation to the terminal bar throughout the width of the fork. Near the opposite ends of the fork 52, and extending between the terminal bar 54 and the brace bar 55, are hinge plates 56 and 57. These plates 56 and 57 are, of course, secured at their opposite corresponding ends to the terminal bar and the brace bar and, as will be observed, these hinge plates are disposed slightly obliquely with respect to the tines 53 so as to be disposed to confront, in parallel spaced relation, the curved portions 42 and 43 of the fork supporting frame. Bolts 58 connect the hinge plates with the portions 42 and 43 so that the fork 52 will be mounted for effective swinging movement on the frame 25.

The fork 52 has a plurality of uprights 59 rising from the terminal bar 54. These uprights are laterally spaced along the length of the bar 54 and have mounted thereon back bars 60 which are arranged in a vertically spaced series and cooperate with the uprights to define a back for the fork. Braces 61 aid in retaining the uprights 59 and the bars 60 in proper position. The fork 52 has guard tines 62 at each end and said side tines are braced by stays 63.

On the upper side bars 26 and 27 of the fork supporting frame 25, and near the forward ends of said bars, are tension units 64 and 65 including brackets 66 which are secured to the arms 26 and 27. Rods 67 are movably mounted in the brackets and have eyes 68 at their outer ends. Springs 69 surround the rods 67 between the brackets and the inner ends of said rods. Chains 69a connect the eyes 68 of the tension units 64 and 65 with the brace bar 55. It will be seen that the springs 69 will pull upon the rear of the fork 52 for applying pressure and flexibility to the points of the tines so that a clean job of picking up hay or the like, over uneven ground, will be assured.

The clutch and shifter mechanism for swinging the fork supporting frame and fork with respect to the body frame will now be described. This mechanism is best seen in Figures 9 through 13 of the drawings. The axle 8 has normally freely mounted thereon, medially of its length, a pulley casting 70 having a pulley 71 and a ratchet wheel 72. Also carried on the axle 8 and disposed adjacent the face of the wheel 72 is a guide collar 73. A key 74, seen in Figure 12, rigidly mounts the collar 73 on the axle 8. As will be seen, the collar 73 is formed of mating sections 74 and 75, connected by bolts 76. Guide flanges 77 and 78 are formed on the collar 73. For limiting the casting 70 against lateral movement on the shaft or axle 8, I provide a collar 78a.

Slidable laterally on the shaft or axle 8 is a clutch element 79 which has diametrically disposed rods 80 and 81 thereon, which rods extend through the flanges 77 and 78 of the collar 73. The rods are engageable in sockets 82, in the face of the ratchet wheel 72. The clutch element 79 is keyed to rotate with the axle 8 but said element 79 includes a split shifter collar 80a having pins 81a and 82a thereon. For engaging the clutch element with the pulley casting 70, a shifter fork 83 is employed, which fork includes fork elements 84 and 85, the element 84 being engaged with the pin 81a and the element 85 with the pin 82a. The elements 84 and 85 are arranged in the same vertical plane and are pivotally connected, respectively, to the front cross beam 5 and to a bracket 86, of U-shape, which has its ends secured to said front cross beam. Bolts 87 and 88 extend through elongated slots 89 to effect the pivotal connection above mentioned.

Connected to the free end of the fork element 84 is a shifting lever 90. A connecting lever element 81 connects the free end of the fork element 85 with the shifting lever 90. A diagonal lever element 92 connects the midportion of the fork element 84 with the shifting lever 90 near its end. A similar diagonal lever 92a connects the element 85 with the lever element 91. The diagonal lever 92 has slotted ends 93 and 94 in which bolts 95 and 96 work, for permitting play in the shifting mechanism and thus insuring proper operation thereof. A tension spring 97 is connected between the element 85 and the shifting lever for keeping this mechanism under tension.

A supporting bracket 98 is connected with the lever element 91 and extends upwardly past the lever 90, to be disposed in longitudinal alinement with the ratchet wheel 72. Mounted on the front cross beam 5 is a yoke 99 which is also disposed in longitudinal alinement with the wheel 72. A pin 100 pivotally connects a pawl 101 to the yoke 99 and a sleeve 102 limits the pawl against lateral movement in the yoke. The pawl 101 has an apertured ear 103 near its forward end. A pawl shifting rod 104 has a hooked end 105 engaged through the ear and a threaded opposite end portion which extends slidably through the upper end of the bracket 98. Adjusting nuts 106 are screwed on the threaded portion. A retractile spring 107, connected between the under side of the pawl and a bracket plate 108, urges the tooth 109 of the pawl 101 into engagement with the ratchet teeth. As best seen in Figures 1 and 8, a shifting rod 110, connected to the free end of the shifting lever, extends rearwardly of the machine and has its end located for convenient manual engagement.

Figure 14:
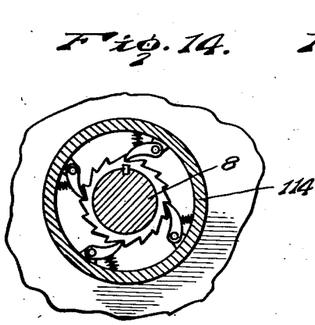
Figure 14 is a detail sectional view showing the structure of one of the road wheels.
Figure 15:
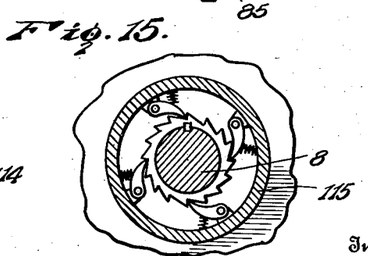
Figure 15 is a detail sectional view showing the structure of the other of the road wheels.

Ground wheels 111 and 112 are carried at the ends of the axle 8. These wheels have differential hubs 113 and 114, seen in Figures 14 and 15, so that easy turning of the machine will be assured.

An operating cable, shown at 115, has its free forward end secured in the groove of the pulley 71, and is adapted to be wound about the pulley in said groove. The rear end of the cable 115 is, as best seen in Figures 17 and 19, mounted between plates 116 of an operating clamp 117. The plates 116 are held in clamping position by bolts 118. Operating rods 119 and 120 have looped corresponding lower ends 121 surrounding the bolts 118. The opposite corresponding ends of the rods 119 and 120 are operatively connected with corresponding rear ends of the operating levers 50 and 51.

The mechanism for controlling tilting movement of the fork 52 will now be described. This mechanism is shown in Figures 4 through 7. Attention is again directed to the hitch plate casting 4. This casting, as heretofore stated, serves the purpose of connecting the rear ends of the beams 2, 3, 15 and 16 of the body frame 1. The hitching plate casting 4 is projected rearwardly and formed near its rear extremity with a socket 122 which is adapted operatively to receive a ball portion 123, carried on the forward end of a tractor 124. A bolt 125 maintains the ball and socket connection. If desired, an oil line 126 may be employed with the hitch to insure proper lubrication. It should be understood that any suitable type of hitching connection may be employed in lieu of the type shown, if desired.

The casting 4 includes an integral upstanding yoke 127 which has a forwardly extending apertured ear 128 thereon. Swingingly mounted on the ear 128, by a pin 129, is a latch assembly shown generally at 130. The latch assembly 130 includes a lever 131 which has its lower end swingingly connected with the yoke 127. The lever 131 has a bowed body member 132 connected thereto. That is to say, one end of the body member 132 is connected to the lever 131 near its inner end by a bolt 133. The free end of the lever 131 is connected to the member 132 near its opposite end by a bolt 134. A loop 135 is carried at the free end of the body member. Pivotally connected with the member 132, near the bowed portion thereof, is a latch member 136 having a hooked end 137. As will be seen, the latch member is connected, near its lower end, by a pivot 138. The latch member extends in an adjacent vertical plane with the lever 131 and is of such length that its outer end is disposed substantially in longitudinal alinement with the loop 135. The end of the member 136 is twisted at 139 and has an eye 140 therein.

Figures 4, 7:
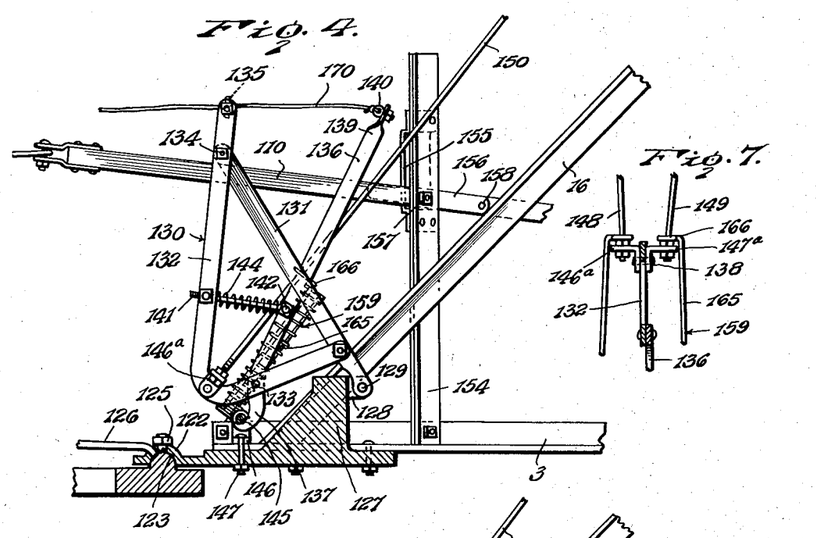
Figure 4 is an enlarged detail sectional view of the fork tilting or dumping control mechanism, showing said mechanism as it would appear when the fork is in upright position.
Figure 7 is a detail sectional view on the line 7—7 of Figure 5, looking in the direction indicated by the arrows.

A spring guide rod 141 has one end pivotally connected to the latch member 136, at 142. The opposite end of the rod 141 extends through a loop 143 carried on the body member 132. A coil spring 144 surrounds the rod 141 and is confined between the member 132 and the member 136. It will be understood that the spring normally urges the latch member 136 away from the body member 132 so that the hooked end 137 is shifted rearwardly and upwardly for normal engagement, as best seen in Figure 4 of the drawings, with a keeper pin 145. The keeper pin 145 is carried by a yoke 146 which is secured by a bolt 147 to the casting 4.

Mounted on the bight portion of the bowed body member 132 are laterally projecting brackets 146a and 147a in which are mounted the lower end portions 148 and 149 of tilting cables 150 and 151. The tilting cables are trained through pulleys 152 and 153 which are carried at the forward corresponding ends of the levers 50 and 51. The cables 150 and 151 will effect rocking movement of the fork.

For supporting the rear end of the shifting rod 110, I provide a supporting post 154 which has a bracket 155 mounted thereon. The post 154 rises from the beam 3, near the casting 4, so that convenient location for the end of the shifting rod 110 will be provided. The shifting rod 110 extends between the bracket 155 and the post 154 and is pivotally connected to a locking link 156 which has its inner end mounted on the post 154 at the base of the bracket 155, as shown at 157. In order to move the shifting rod 110 longitudinally of the machine it is necessary to raise said rod slightly so as to move the pivots 157 and 158, at the end of the locking link, out of longitudinal alinement. When this is done, the rod 110 may be shifted as desired.

Figure 5:
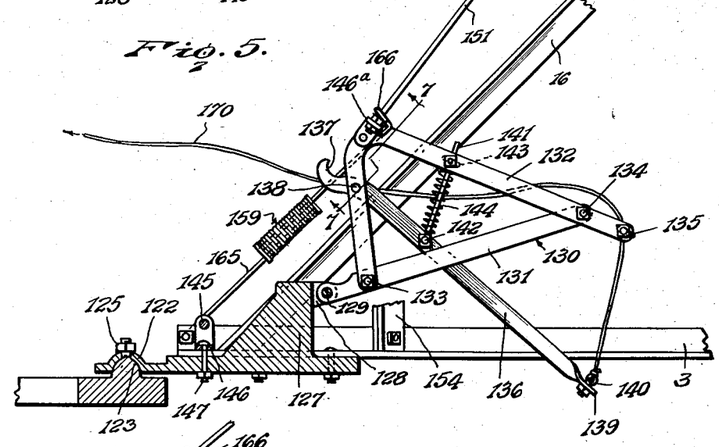
Figure 5 is an enlarged detail sectional view of the fork tilting or dumping mechanism, showing said mechanism in released position, in which position the fork will be tilted.
Figure 6:
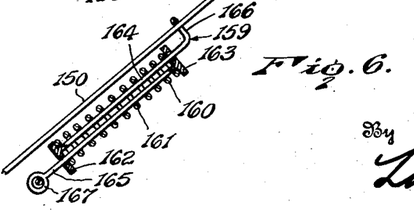
Figure 6 is a detail sectional view showing one of the dumping or tilting mechanism springs.

As best seen in Figures 4, 5 and 6 of the drawings, I employ limiting means for the latch assembly 130. The limiting means, designated generally at 159, includes compression springs 160 and one of these springs is provided for each of the tilting cables 150 and 151. The springs are identical so that a discussion of one will suffice. One of the springs includes a spring portion 161 which is held pressed by means of end pieces 162 and 163. The end pieces have respectively secured thereto rods 164 and 165. That is to say, the rod 164 is connected to the end piece 162 and extends throughout the length of the spring portion 161 therein and through the end 163. The rod 164 is bent laterally and hooked at 166 for engagement about one of the portions 148 and 149. The rod 165 terminates in an eye 167 which is pivotally mounted on the end of one of the side beams of the body frame. As best seen in Figure 5, when the latch assembly 130 is released, the hooked ends 166 will engage against the brackets 146 and 147 and will resiliently retain the cables 150 and 151 against too great movement.

While it is believed that the operation of the invention will be clearly understood after a reading of the foregoing, it is thought advisable to set forth a brief discussion on the subject.

Reference is first had to Figure 2 of the drawings, wherein the machine is shown with the fork 52 in lowered position preliminary to a gathering operation. The tractor and my improved stacker are moved across a field for the purpose of effecting the gathering of hay, straw, or the like. When it is desired to raise the fork, the shifting rod 110 is pulled rearwardly. This operation will have the effect of shifting the lever 90 and associated lever structure, shown in Figures 9 and 10, for engaging the rods 80 and 81 in the sockets 82. The effect of this will be to lock the pulley casting 70 on the axle 8. The pulley will rotate with movement of the axle with the result that the cable 115 will be wound in the groove of the pulley 71. As the cable is wound in the pulley, the read end thereof will be drawn downwardly for rocking the levers 50 and 51 so that their forward ends will be pulled upwardly. This will tilt the fork 52 upwardly, as shown in dotted lines in Figure 2. As the cable 115 continues to wind on the pulley 71, the operating clamp will be caused to engage the pulley frame 35 forwardly of the stop members 40. Continued forward movement of the cable 115 will rock the entire fork supporting frame on the shaft 34 to the position shown in Figure 3 of the drawings. It should be understood that, if desired, the clutch element 79 may be disengaged from the casting 70, when further upward movement of the frame 25 will cease. In this manner, the fork 52 may be raised to any desired position within the limits of its swinging travel. The ratchet pawl 101 automatically engages the teeth of the ratchet wheel 72 for preventing undesired lowering of the fork and fork supporting frame. In its raised position, the fork appears as shown in Figure 3. During the raising operation, the tilting mechanism is in the position shown in Figure 4 of the drawings. That is to say, the hooked end of the latch member 136 is engaged in the keeper pin 145. The result is that the fork is retained in its uppermost position, as shown in full lines in Figure 3 of the drawings.

When it is desired to dump the load carried by the fork 52, a cord 170, trained through the eye 135 and secured to the eye 140, is pulled for disengaging the latch member 136 from the keeper pin 145 and releasing the tilting cables 150 and 151. The fork 52 will then be permitted to swing downwardly for discharging its load. The springs 159 have the effect of cushioning the fork at the end of its downward shifting movement. The entire machine is moved in a rearward direction for the purpose of lowering the fork. The cord 170 is given a quick pulling and releasing movement, when the fork has been lowered, for the purpose of engaging the latch member 136 with the keeper pin 145, so that the fork may again be tilted upwardly on the fork supporting frame when the machine is moving and the clutch is engaged.

It should be understood that the pawl 101 is raised from the ratchet wheel 72 preliminary to lowering the fork. This is a necessary operation in order to permit rearward movement of the machine and is accomplished by shifting the rod 110, which shifting movement urges the bracket 98 rearwardly into engagement with the nuts 106.

Attention is directed to the fact that, as I provide the bracket 98 and the rod 104, the lever 90 may be shifted rearwardly for a portion of its travel without lifting the pawl from the wheel 72. When the lever 90 is shifted to full rearward position, the bracket 98 will, as stated, engage the nuts 106 and thus shift the rod 104 and pawl 101. The rod 110 is shown in full forward position. In full rear position, the link 156 will be in the position shown in dotted lines in Figure 4, so that said rod 110 will be latched in retracted position.

It is desired also to call attention to the fact that my improved stacker may be moved over the ground for any desired distance with the fork in lowered position. The tension units 64 and 65 will keep the tines in such position that gathering of hay or the like may be done effectually, even over rough terrain. It will thus be seen that the machine may be used as a sweep rake.

Having thus described the invention, what I claim is:

1. In a stacker, a body frame, a fork supporting frame, means swingingly connecting the fork supporting frame with the body frame, a fork, means swingingly connecting the fork with the fork supporting frame, a lever supporting frame having mounting posts, operating levers carried by the mounting posts, an axle carried by the body frame, a pulley casting mounted on the axle, a latch assembly mounted on the body frame and having a body member, tilting cables connecting the body member with the fork, said tilting cables being trained through corresponding end portions of the operating levers, operating rods having ends connected with the opposite ends of the operating levers, an operating clamp connected to the opposite ends of the operating rods, an operating cable connected to the clamp and to the pulley casting, and releasing means for the latch assembly, said cable being wound about the axle upon movement of the body frame for initially shifting the operating clamp, operating rods and operating levers whereby the tilting cables will be shifted for tilting the fork to a load retaining position, said operating cable upon further movement engaging the clamp with the fork supporting frame whereby said frame and fork will be elevated to an operating position, said latch assembly being operable for releasing the body member and permitting the fork to tilt to a dumping position.

2. In a stacker, a body frame, a fork supporting frame, means swingingly connecting the fork supporting frame with the body frame, a lever supporting frame, operating levers carried thereby, a fork, means swingingly connecting the fork with the fork supporting frame, tilting cables connected with the rear of the fork and trained through the ends of the operating levers, and a latch assembly having a body portion connected to the opposite ends of the tilting cables, said latch assembly having a lever mounted at the rear of the body frame, said lever supporting the body member, a latch member connected with the body member, and a keeper pin engageable by the latch member for holding the body member in a set position with the tilting cables taut and the fork tilted to load retaining position, said latch member being shiftable for disengagement from the keeper pin whereby the tilting cables will be released for permitting tilting of the fork to a dumping position.

3. A stacker as recited in claim 2, wherein means is employed for shifting the frame and fork to an elevated position.

4. A stacker as recited in claim 2, wherein means is employed which is operable initially for tilting the fork to load retaining position and secondarily to shift the fork supporting frame to an elevated position.

5. A stacker including a body frame, a fork supporting frame, means swingingly connecting the fork supporting frame with the body frame, means on the body frame and operable at movement of said body frame for engaging the fork supporting frame and elevating said fork supporting frame, a fork swingingly connected with the fork supporting frame, means carried by the body frame and fork supporting frame for tilting the fork, and springs on the fork supporting frame and connected with the fork for normally urging said fork when in lowered position toward a surface for a gathering operation.

6. A stacker as recited in claim 5, wherein said last mentioned means comprise tension springs, brackets connecting corresponding ends of the tension springs with the fork supporting frame, and chains connecting the opposite corresponding ends of the tension springs with portions of the fork.

7. In a stacker, a body frame having an axle and a front cross beam, ground wheels on the axle, a pulley casting mounted on the axle to normally rotate thereabout, said pulley casting having a pulley and a ratchet wheel, a guide collar on the axle at the opposite side of the casting and having openings, a clutch element keyed to the axle, a shifter collar on the clutch element, a shifter fork including fork elements engageable with the shifter collar, a shifting lever for shifting the shifter fork and the said shifter fork being pivotally connected with the front cross bar, a shifter rod connected with the shifter fork and extending rearwardly of the body frame for manual engagement, said shifter rod and lever being movable for moving the shifter fork and clutch element and engaging the clutch rods in openings in the casting whereby the pulley casting and clutch element will be locked to rotate with the axle, a fork supporting frame carried by the body, an operating cable connected between the fork supporting frame and the pulley casting, said operating cable being adapted to be wound within the pulley upon rotation of the casting for shifting the fork supporting frame to an elevated position, a pawl, means hingedly mounting the pawl on the front cross beam, said pawl being engageable with the teeth of the ratchet wheel for limiting said axle against rearward movement, and means carried by the shifting lever and operatively connected with the pawl for retracting the pawl and releasing the ratchet wheel for permitting rearward movement of the axle and consequent lowering of the fork supporting frame.

WILLIAM V. WARREN.